United States Patent

[11] 3,608,878

| [72] | Inventor | Roy H. Dreshman<br>Munhall, Pa. |
|------|----------|---------------------------------|
| [21] | Appl. No. | 749,356 |
| [22] | Filed | Aug. 1, 1968 |
| [45] | Patented | Sept. 28, 1971 |
| [73] | Assignee | R. H. Dreshman & Sons, Inc.<br>Homestead, Pa. |

[54] FLAME CUTTING MACHINE
9 Claims, 8 Drawing Figs.

[52] U.S. Cl. .................................... 266/23,
212/18, 212/125
[51] Int. Cl. ........................................ B23k 7/00
[50] Field of Search .......................... 266/23 K,
23 M; 212/10, 11, 18, 21, 124, 125; 148/9; 83/562

[56] References Cited
UNITED STATES PATENTS

| 2,297,343 | 9/1942 | Young | 266/23 M |
| 2,534,958 | 12/1950 | Deming | 266/23 M |
| 2,665,900 | 1/1954 | Begerow | 266/23 M |
| 3,368,803 | 2/1968 | Semper | 266/23 K |
| 3,467,263 | 9/1969 | Auzins et al. | 212/15 X |

FOREIGN PATENTS

| 620,016 | 3/1949 | Great Britain | 266/23 K |

Primary Examiner—J. Spencer Overholser
Assistant Examiner—John E. Roethel
Attorney—Oberlin, Maky, Donnelly & Renner ABSTRACT: Flame cutting machine for cutting iron or steel plates, bars, structural shapes, castings, etc. characterized in the provision of a variable speed positive drive means for the rail mounted torch carriage or gantry thereof by which the carriage is driven in smooth, uniform manner at any cutting speed between zero and maximum, said drive means being mounted on the carriage for floating movement to accommodate misalignment of the carriage guide rails. Machine further characterized in the provision of floating positive drive means for rapid traverse of the carriage.

INVENTOR
ROY H. DRESHMAN

BY Oberlin, Maky, Donnelly & Renner
ATTORNEYS

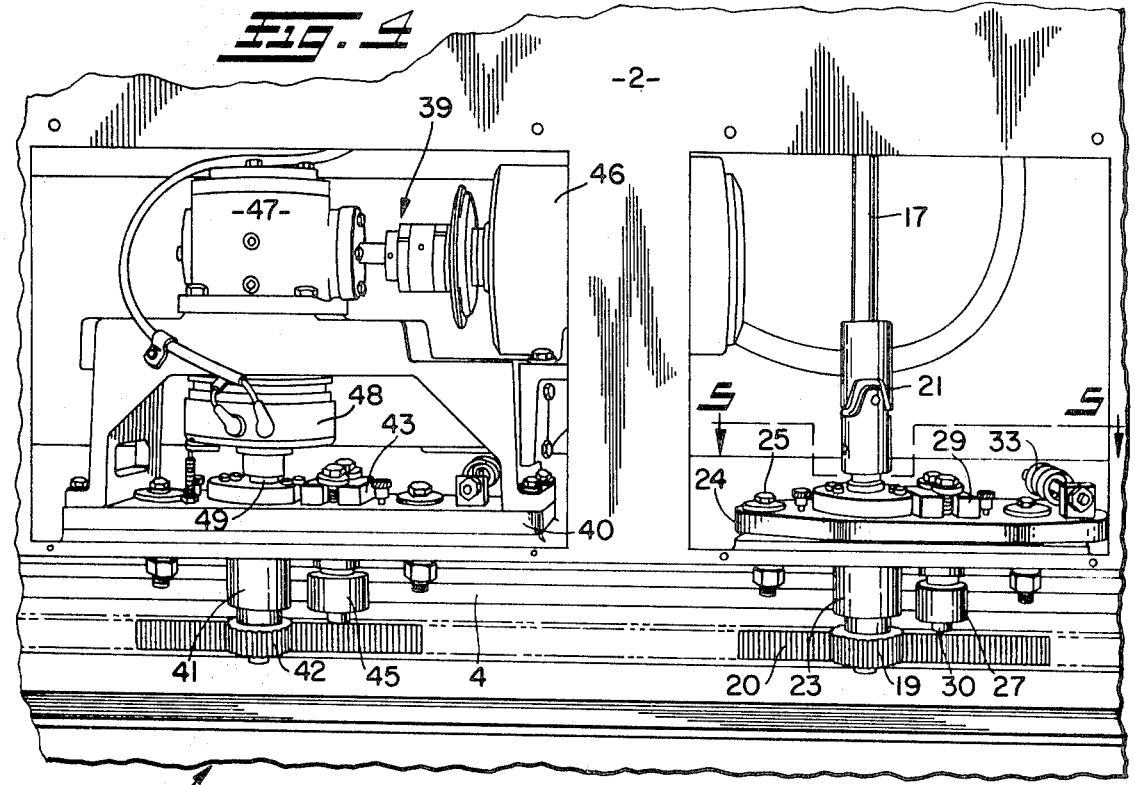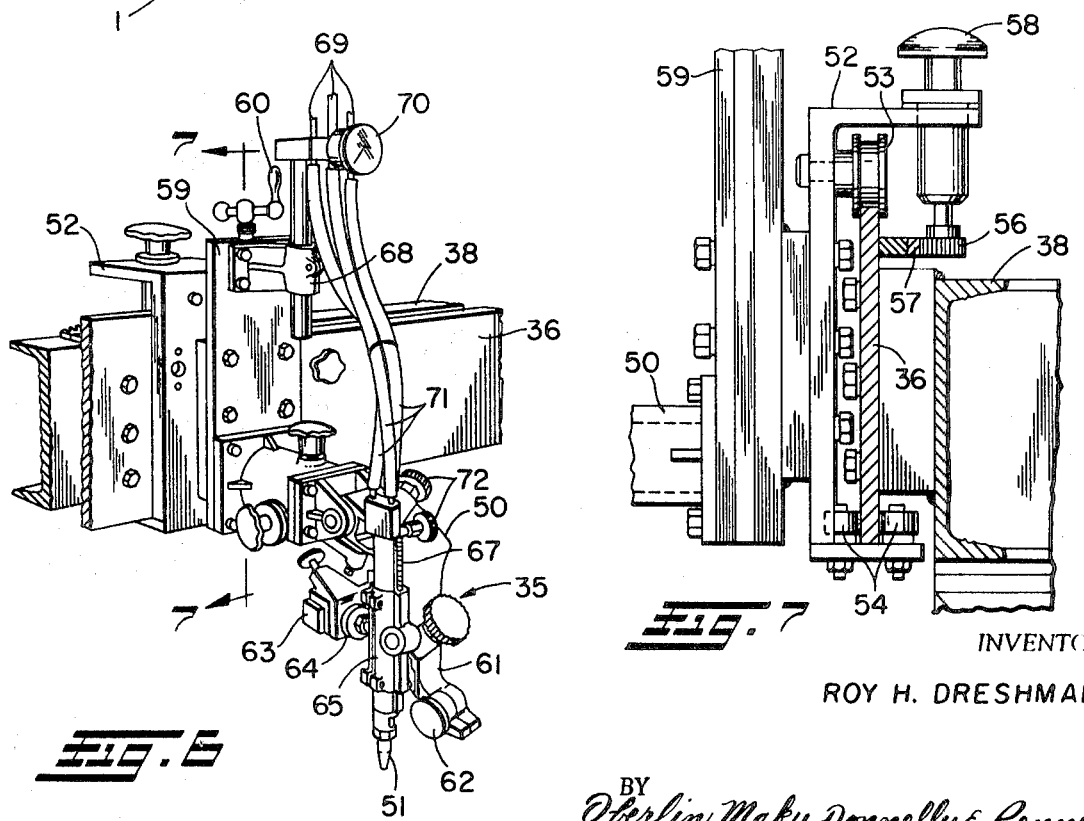

INVENTOR
ROY H. DRESHMAN

BY
Oberlin, Maky, Donnelly & Renner
ATTORNEYS

FLAME CUTTING MACHINE

BACKGROUND OF THE INVENTION

Heretofore, flame cutting machines have comprised torch carriages driven along parallel rails by friction drive wheels; these machines operating in satisfactory manner in a lineal speed range of say 0 to 80 inches/min. However, for a greater speed range of say 0 to 250 inches/min. a friction wheel drive machine requires excessive rail length for acceleration and deceleration of the carriage to and from such higher cutting speeds to prevent drive wheel slippage and skidding. Also, rapid carriage traverse at say, 50 feet/min. is not feasible in a friction drive machine again because of added rail length required for acceleration and deceleration.

SUMMARY OF THE INVENTION

In the present invention, the torch carriage is positively driven, as by a gear-rack drive, on parallel rails, thus enabling constant, smooth carriage movement at high speed for a major portion of the length of the rails; such drive means being floatable on the torch carriage so as to maintain the pitch centers between the gears and the racks even though the rails may not be perfectly parallel to each other.

It is another object of this invention to provide an independent floating rapid traverse drive mechanism for the torch carriage whereby the carriage may be quickly and accurately positioned prior to commencing its stock-cutting operation.

It is another object of this invention to provide a carriage having a transverse beam having a track on which one or more single or multiple cutting torches may be adjustably mounted for movement longitudinally with the carriage for making one or more longitudinal cuts in the stock.

It is another object of this invention to provide a carriage having a transverse beam having a track on which a single or multiple cutting torch may be mounted for movement longitudinally therealong for making one or more transverse cuts in the stock.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

BRIEF DESCRIPTION OF THE DRAWING

FIG. 4 is a perspective view of a portion of one end of the machine carriage as viewed along the line 4—4, FIG. 1;

FIG. 6 is a fragmentary perspective view showing a typical flame cutting torch mounted on the transverse track of the carriage;

FIG. 7 is a transverse cross section view taken substantially along the line 7—7, FIG. 6.

DESCRIPTION OF THE PREFERRED EMBODIMENT

Figure 1:
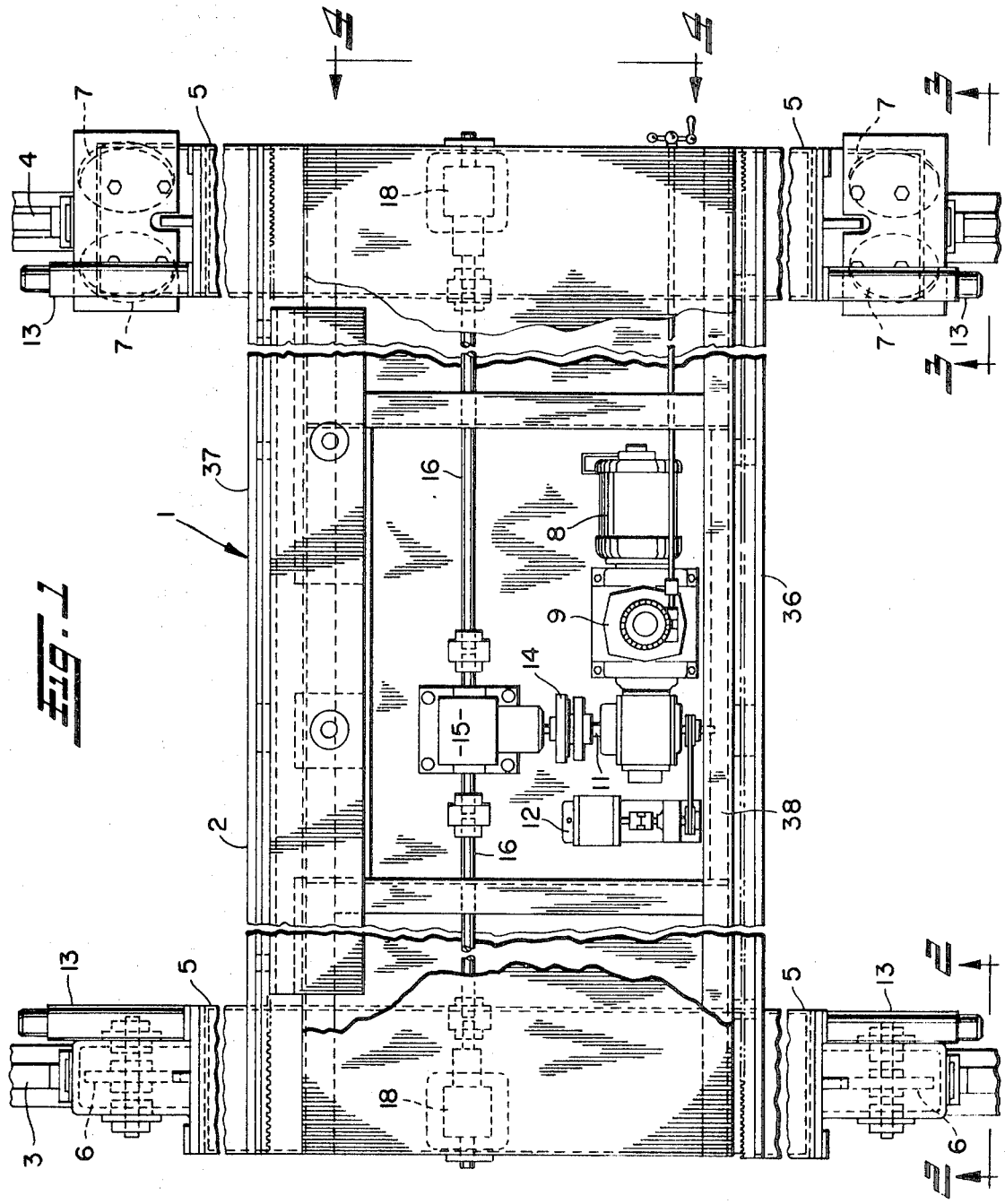
FIG. 1 is a top plan view of one embodiment of the present invention.
Figure 2:
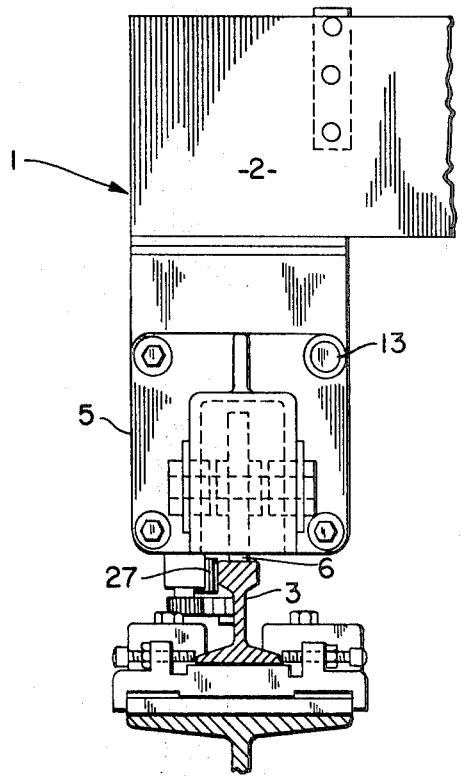
FIG. 2 is a cross section view taken substantially along the line 2—2, FIG. 1.
Figure 3:
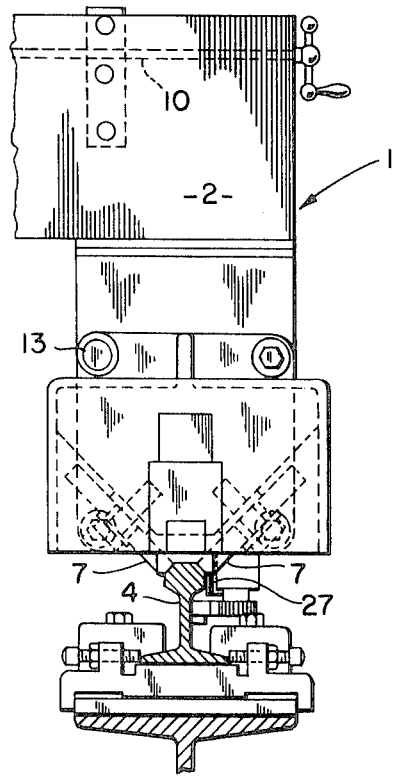
FIG. 3 is a cross section view taken substantially along the line 3—3, FIG. 1.

Referring now in detail to the drawings, and first more especially to FIGS. 1 to 3, the flame cutting machine 1 comprises a carriage 2 which extends transversely across the parallel rails 3 and 4 and has longitudinal extensions 5 at its ends in which are mounted guide rolls 6 and 7 which engage the respective rails 3 and 4. The extensions 5 are further provided with yieldable bumpers 13 adapted to engage stops, no shown, at the ends of the respective rails 3 and 4.

The guide rolls 7 are tilted to engage the V rail 4 thus to maintain the carriage against skewing, whereas, the other guide rolls 6 are cylindrical and ride on the flat top surface of the other rail 3, whereby the carriage 2 is guided for straight line movement along rail 4 even though rail 3 is not perfectly parallel to rail 4.

THE CARRIAGE DRIVE MEANS

As shown in FIGS. 1 to 5, the carriage 2 is driven longitudinally along the rails 3 and 4 by an electric drive motor 8 and a variable speed drive 9 which is adjusted from say 0 to 250 inches/min. carriage speed by turning the speed adjusting shaft 10. The output shaft 11 is coupled to a tachometer generator 12 or the like, which will operate a suitable indicator gauge, not shown, to enable precision adjustment of carriage speed. The drive shaft 11 has suitable clutch means 14 and enters a gear box 15 from which horizontal drive shafts 16 extend in opposite directions, the shafts 16 being coupled to vertical drive shafts 17 by angle drive units 18, said shafts 17 having gears 19 keyed thereto for meshing with gear racks 20 on the sides of the respective rails 3 and 4. Each vertical drive shaft 17 has two universal joints 21, one of which is shown in FIG. 4, whereby each gear 19 may float transversely and be adjusted longitudinally of its respective rail 3 or 4.

ADJUSTABLE AND FLOATING DRIVE MECHANISM

Figure 5:
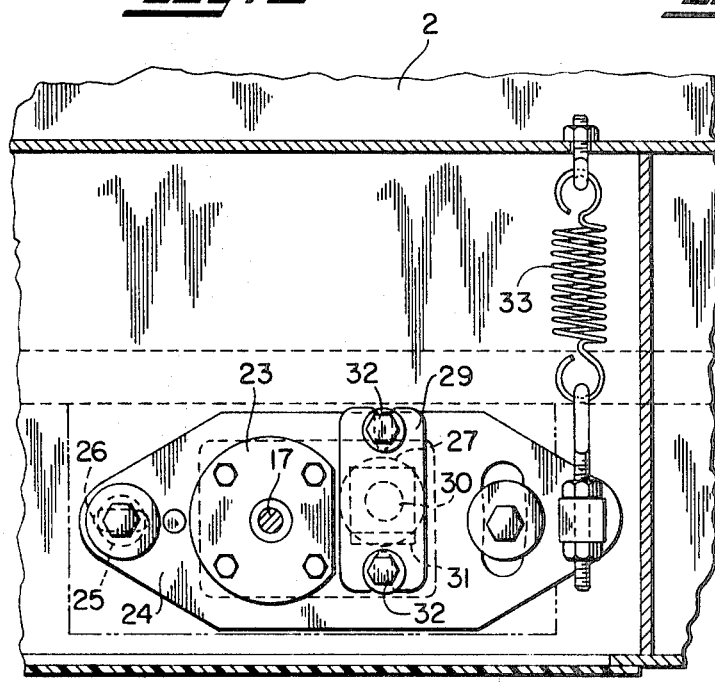
FIG. 5 is a top plan view of the floating gear drive mechanism as viewed along the line 5—5, FIG. 4.

As best shown in FIGS. 4 and 5 the drive shaft 17 to which the drive gear 19 is affixed is journaled in a bearing housing 23, the bearing housing being secured to a plate 24 which at one end is mounted for swinging floating action on a pivot 25. The pivot 25 is longitudinally adjustably mounted in a slot 26 in the carriage 2 so that the teeth of the drive gear 19 will mesh with the teeth of the gear rack 20 affixed on the outside of the respective side of each rail 3 and 4. The universal joints 21 aforesaid make possible such longitudinal adjustment of the bearing housing 23 and plate 24.

Each plate 24 has a guide roller 27 engaged on the outside of the respective rail 3 or 4 which is in parallel relation to the respective gear rack 20. The support 29 for said guide roller shaft 30 is transversely adjustable in a slot 31 in the said plate and is secured as by the bolts 32 in adjusted position whereat, when the guide roller 27 is engaged with its respective rail 3 or 4, the pitch circle of the drive gear 19 is tangent to the pitch line of the gear rack 20.

Each plate 24 has an arcuate slot struck from the center of the pivot 25 so that the plate 24, together with the guide roller 27 and drive gear 19, may swing out or in to maintain proper gear and rack tooth engagement despite departure of rails 3 and 4 from true parallelism, an adjustable tension spring 33 connected to the carriage 2 and to the end of the plate 24 opposite the pivot 25 holding the guide roller 27 in engagement with the respective rail 3 or 4.

From the foregoing, it can be seen that when the drive motor 8 is energized and the clutch 14 is engaged, the drive gears 19 in rotating in opposite directions will move the carriage 2 along the rails 3 and 4 whereby one or more cutting torches 35 mounted on the track 36 or 37 on the carriage beam 38 will cut the iron or steel plate, bar, structural shape, or the like supported between the rails 3 and 4 beneath the carriage beam 38.

RAPID TRAVERSE MECHANISM

The rapid traverse mechanism 39 as shown at the left side of FIG. 4 is adjustably and floatably mounted in much the same manner as the carriage drive mechanism just described, except that the adjustable and pivotally mounted plate 40 which carries the support 41 for the rapid traverse drive gear 42 and the support 43 for the guide roller 45 has secured thereto the drive motor 46 and worm drive unit 47 with intervening clutch means 48 between the worm drive unit 47 and the output shaft 49 to which the gear 42 is affixed. The rapid traverse mechanism 39 may, as aforesaid, be arranged to rapidly move the carriage 2 at a speed of for example, 50 feet/min., while the cutting drive mechanism may be accurately adjusted between 0 to 250 inches/min.

CUTTING TORCH UNIT

Referring to FIGS. 6 and 7, the crossbeam 38 has tracks 36 and 37 on the front and rear sides thereof, and adjustable longitudinally along either track 36 or 37 are one or more torch units 50. As shown in FIGS. 6 and 7, the torch unit 50 there shown has a single torch 51 thereon but it is to be understood that two, three, or more torches 51 may be mounted on each torch unit 50 as hereinafter described.

Each torch unit 50 comprises a base 52 which is guided for longitudinal movement with respect to the track 36 or track 37, as by means of upper and lower rollers 53 and 54 (see FIG. 7,) and the base 52 is adjustable longitudinally along the track 36 or 37 as by the gear 56 which meshes with a rack 57 on the rear side of the track. If desired, the gear 56 may be driven by a reversible electric motor instead of the hand wheel 58 shown.

MOunted on said base 52 is a vertical slide 59 which may be vertically adjusted by turning the crank 60, and, again, said vertical adjustment operation may be motorized by substituting a reversible electric motor for the crank 60. Pivotally mounted at the lower end of the vertical slide 59 is a riding device 61 equipped with a roller 62 which runs along the top surface of the stock to be cut. Extending laterally from the riding device 61 is an elongated bar 63 which has a torch clamp 64 adjustable therealong and as evident, the bar may be of any length for mounting two, three or more torches 51 thereon.

The oxyacetylene blow pipe or torch 51 or the like is mounted in a sleeve portion 65 of the clamp 64 and is vertically adjustable therein as by the conventional worm and gear adjusting mechanism which cooperates with the gear rack 67 formed on the torch 51. In this way, when two or more torches 51 are mounted on a single riding device 61 each may be adjusted up or down to be a specified distance from the stock which is to be cut. The upper portion of the vertical slide 59 is provided with a clamp 68 in which the oxygen and acetylene supply hoses 69 are connected, including suitable oxygen pressure gauge 70. From this supply manifold separate hoses 71 are connected to the torch 51, the latter having suitable control valves 72.

Figure 8:
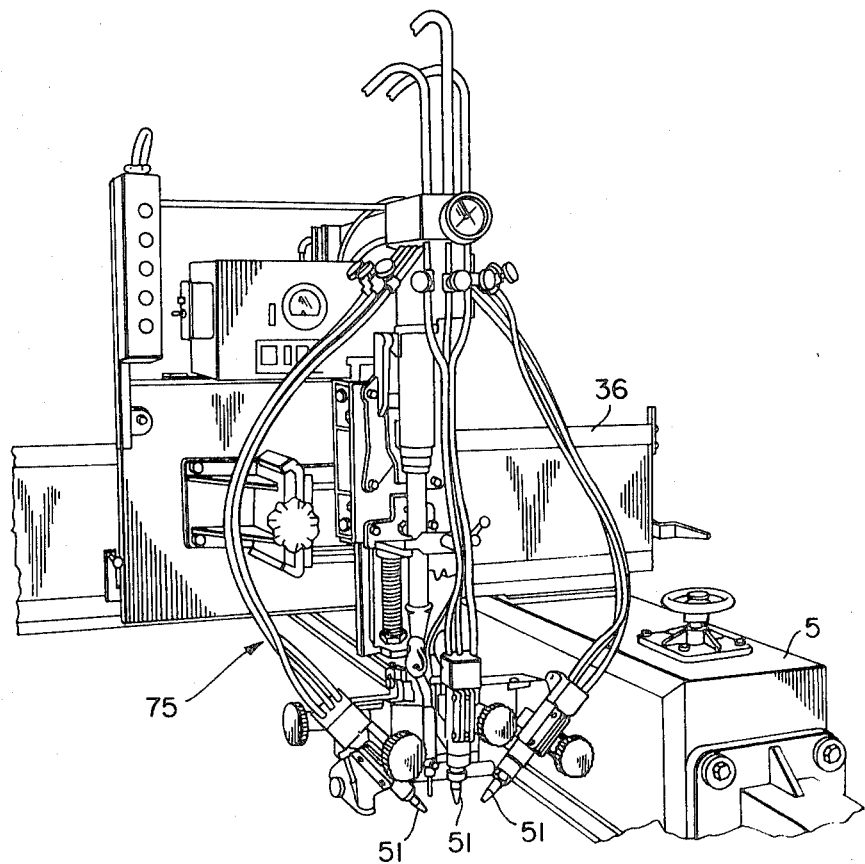
FIG. 8 is a perspective view of a motorized torch mounted for movement longitudinally of the carriage beam.

Referring now to FIG. 8, the torch unit 75 is shown as being motorized for moving longitudinally along the adjusting track 36 and 37. In this case three torches 51 are shown in converging relation, the vertical torch 51 being effective to cut through the stock as carriage 2 travels longitudinally and the inclined torches 51 being effective to bevel the edges of the cut stock. Other modes of applying the principle of the invention may be employed, change being made as regards the details described, provided the features stated in any of the following claims, or the equivalent of such, be employed.

I therefore particularly point out and distinctly claim as my invention:

1. A flame cutting machine comprising a carriage supported on parallel rails for movement therealong; said carriage comprising a beam extending transversely over said rails and having opposite longitudinally extending portions which are provided with rollers adjacent their ends engaging said rails; drive means on said beam having oppositely extending drive shafts which terminate in downturned shaft portions adjacent the ends of said beam; drive gears on said shaft portions meshing with gear racks on the respective rails to propel said carriage along said rails; a cutting torch on said beam operative to cut stock therebeneath and between said rails as said carriage travels on said rails; a support means engaging at least one of said downturned shaft portions movably connected to the carriage of lateral movement of the support means relative the carriage, the support means thereby maintaining the gears in meshing engagement with the respective racks despite deviation of the rails and racks from true parallelism.

2. The machine of claim 1 wherein the downturned shaft portion engaged by said support means includes a universal joint therein dividing the downturned shaft portion into upper and lower sections, the lower section being engaged by the support means and movable laterally relative the carriage.

3. The machine of claim 1 wherein one of said rails and the carriage rollers engaged therewith are arranged to guide said carriage for movement in a straight path parallel to said one rail.

4. The machine of claim 3 wherein the other of said rails and the carriage rollers engaged therewith are arranged to support said side of said carriage without disturbing the straight path of movement of said carriage despite slight departure of said other rail from straightness and/or nonparallelism with respect to said one rail, said support means being on the same side of the carriage as the carriage rollers engaging said other rail.

5. The machine of claim 4 wherein said one rail has beveled upper edges with which correspondingly inclined cylindrical rollers are engaged; and wherein said other rail has a substantially planar top surface with which cylindrical rollers are engaged.

6. The machine of claim 1 wherein said torch is supported on said beam for movement therealong for transverse cutting of stock at various longitudinal positions of said carriage on said rails.

7. The machine of claim 1 wherein said torch is mounted on a riding device which is pivotally mounted on said beam, said riding device engaging the top surface of the stock to be cut thus to maintain said torch a predetermined distance above said stock during the cutting operation.

8. The machine of claim 7 wherein said riding device has a transverse bar to which said torch is adjustably clamped.

9. The machine of claim 8 wherein said transverse bar is of length to accommodate another torch in adjustable spaced relation to the first-mentioned torch.